(12) United States Patent
Dean

(10) Patent No.: US 7,239,944 B2
(45) Date of Patent: Jul. 3, 2007

(54) PROGRAMMABLE LAWN MOWER

(76) Inventor: Jason A. Dean, 503 Warren St., Chittenango, NY (US) 13037

( * ) Notice: Subject to any disclaimer, the term of this patent is extended or adjusted under 35 U.S.C. 154(b) by 210 days.

(21) Appl. No.: 10/631,465

(22) Filed: Jul. 31, 2003

(65) Prior Publication Data
US 2004/0111196 A1   Jun. 10, 2004

Related U.S. Application Data

(63) Continuation-in-part of application No. 10/401,266, filed on Mar. 27, 2003.

(60) Provisional application No. 60/368,196, filed on Mar. 28, 2002.

(51) Int. Cl.
*A01D 34/00* (2006.01)
*G05D 1/00* (2006.01)
*G06F 19/00* (2006.01)

(52) U.S. Cl. .............................. 701/24; 701/23; 701/25

(58) Field of Classification Search ............ 701/23–25, 701/1, 36, 50, 200, 224; 73/178 R; 700/245, 700/90, 113; 316/568.12, 568.13
See application file for complete search history.

(56) References Cited

U.S. PATENT DOCUMENTS

| | | | |
|---|---|---|---|
| 4,133,404 A | 1/1979 | Griffin | |
| 4,180,964 A | 1/1980 | Pansire | |
| 4,318,266 A | 3/1982 | Taube | |
| 4,777,785 A | 10/1988 | Rafaels | |
| 4,851,775 A | 7/1989 | Kim et al. | |
| 4,887,415 A | 12/1989 | Martin | |
| 4,944,140 A | 7/1990 | Donaghey | |
| 5,007,234 A | 4/1991 | Shurman et al. | |
| 5,163,273 A | 11/1992 | Wojtkowski et al. | |

(Continued)

FOREIGN PATENT DOCUMENTS

DE   3918867 A1   10/1989

(Continued)

OTHER PUBLICATIONS

Unknown, PNI V2Xe 2-Axis Compass Module, from PNI Corp., Oct. 2005—1 page.*

(Continued)

*Primary Examiner*—Cuong Nguyen
(74) *Attorney, Agent, or Firm*—Joseph B Milstein; Hiscock & Barclay LLP

(57) ABSTRACT

A robotic apparatus for traversing a selected area autonomously that senses orientation relative to the Earth's magnetic field or other "environmental" signals. The robotic apparatus is provided in two models, a master that can record directive and compass or "environmental signal" readings, or that can record received location information, to provide at least one command recorded on a machine-readable medium representing an instruction for traversing an area of interest, and a slave that lacks the recording capability. Both master and slave models can replay recorded commands, and compare the expected orientation from the command with an actual orientation sensed during autonomous operation. If an error exceeding a predetermined value is observed, a corrective action is taken. The robotic apparatus is able to utilize a tool to perform a task at one or more locations, such as cutting, shoveling and digging. In one embodiment, the robotic apparatus is a lawn mower.

20 Claims, 11 Drawing Sheets

U.S. PATENT DOCUMENTS

| | | | |
|---|---|---|---|
| 5,204,814 A | 4/1993 | Noonan et al. | |
| 5,323,593 A | 6/1994 | Cline et al. | |
| 5,461,292 A * | 10/1995 | Zondlo | 318/587 |
| 5,553,407 A * | 9/1996 | Stump | 37/348 |
| 5,704,142 A * | 1/1998 | Stump | 37/348 |
| 5,704,787 A * | 1/1998 | Hickok et al. | 433/166 |
| 5,974,347 A * | 10/1999 | Nelson | 701/22 |
| 6,009,358 A | 12/1999 | Angott et al. | |
| 6,140,787 A * | 10/2000 | Lokhorst et al. | 318/568.18 |
| 6,199,000 B1 * | 3/2001 | Keller et al. | 701/50 |
| 6,255,793 B1 * | 7/2001 | Peless et al. | 318/580 |
| 6,321,036 B1 * | 11/2001 | Huang | 392/453 |
| 6,321,515 B1 | 11/2001 | Colens | |
| D451,931 S | 12/2001 | Abramson et al. | |
| 6,339,735 B1 * | 1/2002 | Peless et al. | 701/23 |
| 6,417,641 B2 * | 7/2002 | Peless et al. | 318/580 |
| 6,421,003 B1 * | 7/2002 | Riley et al. | 342/357.11 |
| 6,443,509 B1 | 9/2002 | Levin et al. | |
| 6,454,036 B1 * | 9/2002 | Airey et al. | 180/167 |
| 6,459,955 B1 * | 10/2002 | Bartsch et al. | 700/245 |
| 6,493,613 B2 * | 12/2002 | Peless et al. | 701/23 |
| 6,535,299 B1 | 3/2003 | Scherz | |
| 6,553,229 B1 * | 4/2003 | Dent | 455/434 |
| 6,615,108 B1 * | 9/2003 | Peless et al. | 700/245 |
| 6,810,324 B1 * | 10/2004 | Nadkarni | 701/207 |
| 7,103,457 B2 * | 9/2006 | Dean | 701/23 |
| 7,107,132 B2 * | 9/2006 | Dean | 701/23 |
| 2001/0022506 A1 * | 9/2001 | Peless et al. | 318/580 |
| 2002/0019696 A1 * | 2/2002 | Kruse | 701/207 |
| 2002/0140393 A1 * | 10/2002 | Peless et al. | 318/580 |
| 2002/0193121 A1 * | 12/2002 | Nowak et al. | 455/456 |
| 2003/0023356 A1 * | 1/2003 | Keable | 701/23 |
| 2004/0010343 A1 * | 1/2004 | Dean | 700/245 |
| 2004/0111196 A1 * | 6/2004 | Dean | 701/23 |
| 2005/0007057 A1 * | 1/2005 | Peless et al. | 318/580 |

FOREIGN PATENT DOCUMENTS

| | | |
|---|---|---|
| EP | 1 016 946 A1 | 7/2000 |
| WO | WO 01 56362 A1 | 8/2001 |

OTHER PUBLICATIONS

Siegwart et al., Active Magnetic Bearings- Autonomous Mobile Robots, Chapter 4 (4 pages).*

Song et al., Mopdelling and simultation of autonomous underwater vehicles: design and implementation, Oceanic Engineering, IEEE Journal of, vol. 28, issue 2, Apr. 2003, pp. 283-296, cited by others.*

* cited by examiner

| FIG. 1A | FIG. 1B |
| FIG. 1C | FIG. 1D |

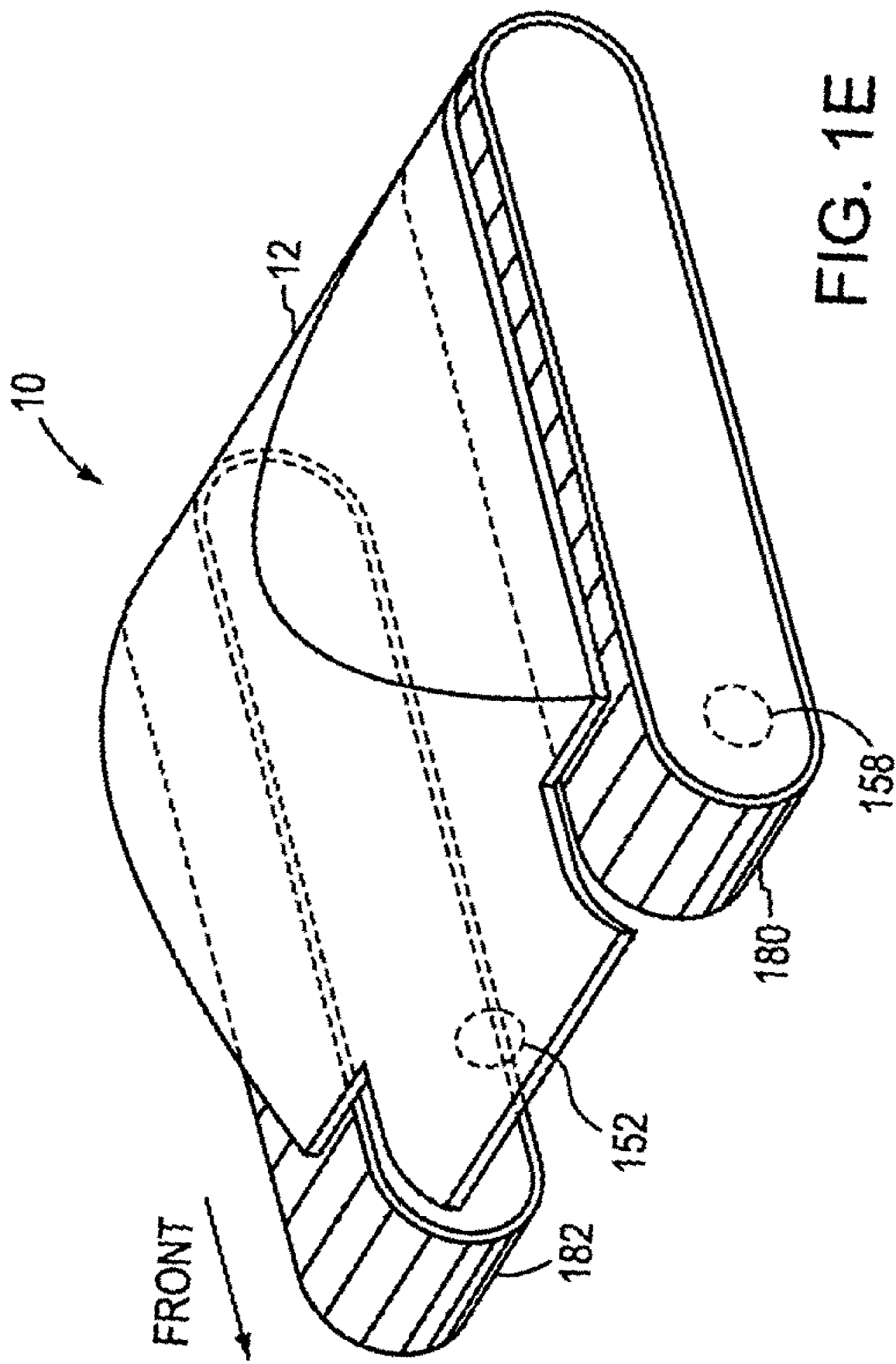

PROGRAMMABLE LAWN MOWER

CROSS-REFERENCE TO RELATED APPLICATIONS

This application is a continuation-in-part of U.S. patent application Ser. No. 10/401,266 filed Mar. 27, 2003, which application is incorporated herein by reference in its entirety. This application also claims, through said U.S. patent application, priority to and the benefit of U.S. provisional patent application Ser. No. 60/368,196, filed Mar. 28, 2002, which U.S. provisional patent application is incorporated herein by reference in its entirety.

FIELD OF THE INVENTION

The invention relates to mobile robotic apparatus in general and particularly to a robotic apparatus that comprises programmed instructions for traversing an area of interest autonomously.

BACKGROUND OF THE INVENTION

Tasks such as mowing lawns are tedious and can be unpleasant, but are necessary. A common fantasy depicts a homeowner relaxing in a hammock with a cool drink on a warm summer day, possibly in the shade of a tree, while a robotic device mows the lawn.

The prior art includes a number of patents issued for robotic lawnmowers. U.S. Pat. No. 4,777,785, issued on Oct. 18, 1988 to Rafaels, describes a method of guiding a robotic lawnmower that relies on pairs of sensors, one of which emits and one of which detects electromagnetic radiation. U.S. Pat. No. 4,887,415, issued on Dec. 19, 1989 to Martin, describes a robotic lawnmower that relies on infrared obstacle detectors to provide guidance signals. U.S. Pat. No. 5,163,273, issued on Nov. 17, 1992 to Wojtkowski et al., describes a robotic lawnmower that relies on a buried wire to provide guidance. U.S. Pat. No. 5,974,347, issued on Oct. 26, 1999 to Nelson, describes a robotic lawnmower that relies on a plurality of radio transmitters to provide guidance signals. U.S. Pat. No. 6,009,358, issued on Dec. 28, 1999 to Angott et al., describes a robotic lawnmower that relies on a plurality of transceivers, one that transmits signals having different propagation velocities, and one that receives the signals. German Patent No. DE3918867, which was published on Oct. 19, 1989, also describes a robotic lawnmower that employs buried iron bars as a guidance system. Friendly Robotics is the assignee of U.S. Pat. Nos. 6,255,793, 6,339, 735, 6,417,641, 6,443,509, and 6,493,613, and U.S. Design Pat. No. D451,931, directed to robotic lawnmowers that use proximity sensors to detect predefined boundaries.

The manual cutting of an edge is a variation on the installation of boundaries, paths, buried wires, or transmitters. Some robotic lawn mowers rely on distinguishing the cut height of grass from the uncut, taller grass, and following the edge. One example is described in U.S. Pat. No. 4,133, 404, issued Jan. 9, 1979 to Griffin. A manually cut edge or border is simply another predefined boundary or path, one that needs to be "reinstalled" before each occasion when the grass is to be cut.

One problem that is common to each of the robotic systems described above is the need to provide and to locate transmitters or other indicators of a desired path or boundary. The necessity to place such transmitters or other locators involves considerable expenditure of time, effort, and funds, and may require precise measurements over considerable distances. Alteration of the desired actions of the robotic apparatus may require further time, effort, and funds to change the configuration of the previously defined path or boundary. There is a need for a robotic apparatus such as a lawnmower that can operate autonomously without the necessity to define either a path or a boundary by the placement of transmitters or other indicators.

SUMMARY OF THE INVENTION

In one aspect, the invention relates to a programmable robotic apparatus. The programmable robotic apparatus comprises a drive system, the drive system comprising a plurality of independently operable treads (or wheels or other motive mechanism), a control module in electrical communication with the drive system, the control module configured to command the operation of each tread, a memory module in electrical communication with the control module, the memory module configured to store and retrieve information, a transmitter in electrical communication with said control module, said transmitter configured to transmit a signal comprising at least a unique identifier associated with the robotic apparatus; and a receiver in electrical communication with said control module, said receiver configured to receive a signal comprising location information; whereby said robotic apparatus is able to discern at least one of a location and an orientation of said programmable robotic apparatus.

In one embodiment, the apparatus is configured to operate autonomously based at least in part on information stored in the memory module. In one embodiment, the programmable robotic apparatus further comprises a tool configured to perform a mechanical operation. In one embodiment, the tool configured to perform a mechanical operation is selected from the group consisting of a cutting tool, a shoveling tool, and a vacuuming tool. In one embodiment, the programmable robotic apparatus is a programmable lawn mower.

In one embodiment, the memory module is selected from the group consisting of a magnetic tape, a floppy disc, a hard disc, a CD-RW disc, RAM, EPROM, EEPROM, and a flash memory. In one embodiment, the programmable robotic apparatus is configured to discern at least one of a location and an orientation relative to at least one of a GPS satellite, a cellular telephone communication antenna, a radio broadcast antenna, a television broadcast antenna, a radio broadcast satellite, and a television broadcast satellite.

In one embodiment, the programmable robotic further comprises a command receiver module in electrical communication with the control module. In one embodiment, the command receiver module is configured to receive signals from a portable transmitter. In one embodiment, the command receiver module is configured to receive signals comprises directives.

In another aspect, the invention features a method of operating a programmable robotic apparatus. The method comprises the steps of providing at least one command recorded on a machine-readable medium, the at least one command representing an instruction for traversing an area of interest, operating the programmable robotic apparatus according to the at least one command recorded on the machine-readable medium, discerning at least one of a location and an orientation of the programmable robotic apparatus, comparing the at least one of the location and the orientation of the programmable robotic apparatus to a corresponding one of a location and a direction recorded in the at least one command to determine an error signal, and in the event that the error signal exceeds a predetermined value, commanding the programmable robotic apparatus to take a corrective action, whereby the programmable robotic apparatus autonomously traverses an area of interest.

In one embodiment, the steps of discerning at least one of a location and an orientation, comparing at least one of the location and the orientation, and in the event that the error signal exceeds a predetermined value, commanding the programmable robotic apparatus to take a corrective action, are performed iteratively during a period of operation of the programmable robotic apparatus.

In one embodiment, the method further comprises the step of performing an operation with a mechanical tool attached to the programmable robotic apparatus. In one embodiment, the programmable robotic apparatus stands in one location during the operation with the mechanical tool.

In yet another aspect, the invention relates to a method of providing at least one command recorded on a machine-readable medium, the at least one command representing an instruction for traversing an area of interest. The method comprises the steps of providing a programmable robotic apparatus, operating the programmable robotic apparatus under external control, the programmable robotic apparatus receiving directives from an external source and traversing an area of interest, taking readings from a receiver of the programmable robotic apparatus, the receiver configured to receive a signal comprising location information, and recording the directives and readings on a machine-readable medium for later recovery.

In one embodiment, the directives are recorded in the format in which the directives are received. In one embodiment, the directives are recorded in a different format from the format in which the directives are received.

In a further embodiment, the invention features a computer program recorded on a machine-readable medium. The computer program comprises a supervisory module that controls the autonomous operation of a programmable robotic apparatus and that, as required, receives information recorded on a machine-readable medium, an orientation receiver module that derives orientation information from a signal received by a receiver of the programmable robotic apparatus, and a computation module that computes an error signal based at least in part on orientation information derived from the environmental signal detection module and information recorded on the machine-readable medium.

In one embodiment, the computer program further comprises an instruction receiver module that receives directives from an external source regarding operation of the programmable robotic apparatus. In one embodiment, the computer program further comprises an error correction module that, in the event that the error signal exceeds a predetermined value, computes an error correction to be provided as a corrective action command to the programmable robotic apparatus.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1E is an illustrative perspective representation of a robotic apparatus, according to principles of the invention;

DETAILED DESCRIPTION

Figure 1A:
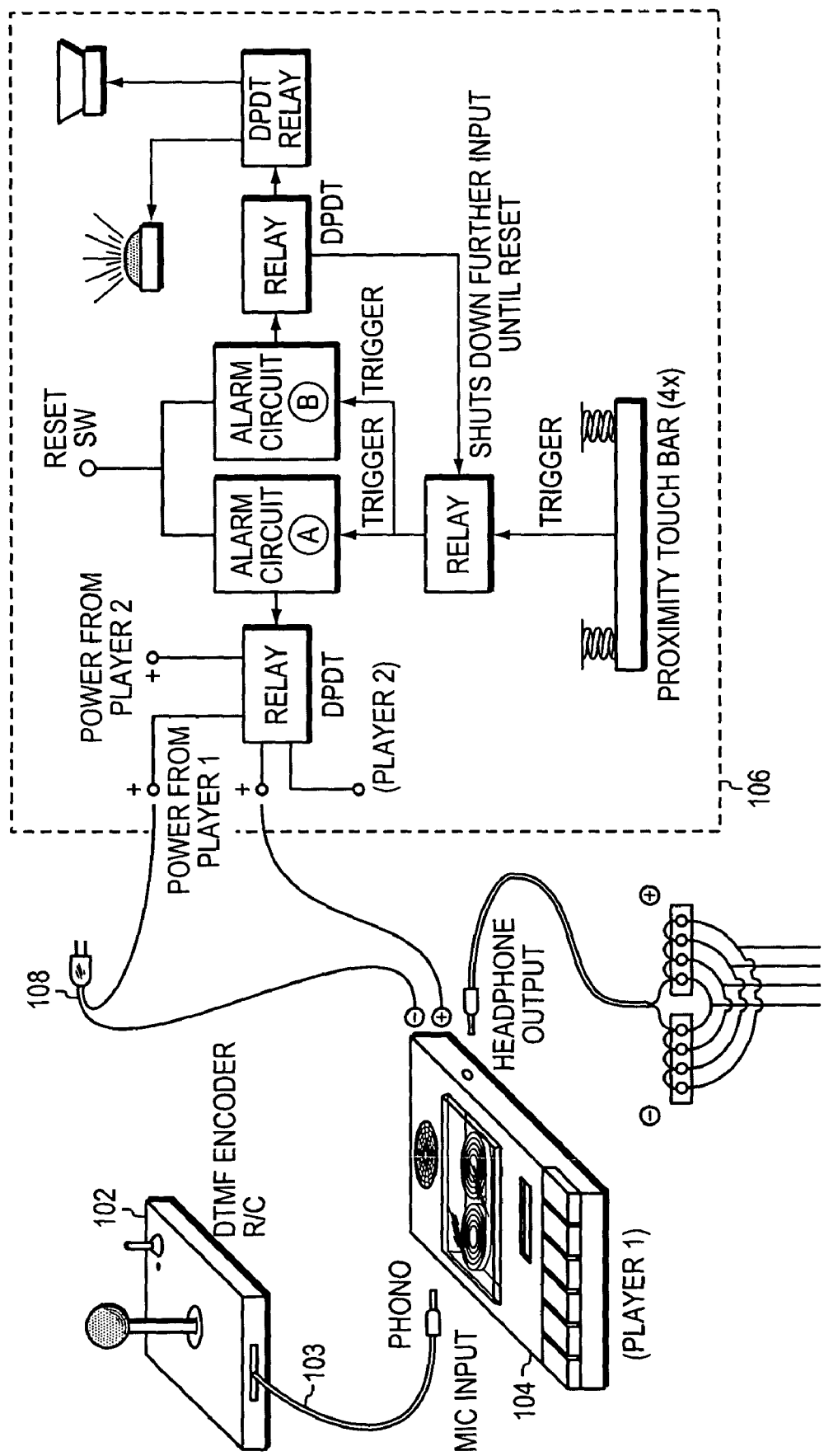
FIGS. 1A–1D illustrate an exemplary embodiment of a robotic apparatus suitable for mowing lawns that traverses an area autonomously, according to principles of the invention.

Robotic apparatus built and operated according to principles of the invention provide systems and methods for operating in an autonomous manner under the control of a programmed computer operating in communication with a digital compass configured to discern an orientation of the robotic apparatus. In one embodiment, the digital compass senses the magnetic field of the planet Earth. The digital compass can be implemented as a device built on a circuit board, which can discriminate two or three axial directions. Orientation readings provided by the compass are used during the operation of the robotic apparatus. An electronic digital compass suitable for use with the present invention is described in U.S. Pat. No. 4,851,775, issued on Jul. 25, 1989 to Kim et al., and assigned to Precision Navigation, Inc. of Menlo Park, Calif., the entire disclosure of which is expressly incorporated herein by reference in its entirety. Electronic digital compasses of this type are available commercially from Precision Navigation, Inc., for example as the Vector2X electronic digital compass. Technical application notes for the Vector2X electronic digital compass are available online at http://www.precisionnav.com/legacy/technical-information/pdf/vector-2x.pdf.

In alternative embodiments, the electronic digital compass can be replaced with other apparatus for detecting the location of the robotic apparatus relative to a signal that is not provided for use with a specific area of interest that the robotic apparatus will traverse, but rather is provided for other purposes, but can be adapted to the use of the robot. A first example includes the detection of signals from a plurality of satellites in orbit about the planet Earth, such as Global Positioning System (GPS) signals with a GPS detector. Another example is the detection of signals from a plurality of cellular telephone communication towers erected at known locations using cellular telephone technology, and locating a robot by triangulation. A still further example is the detection of signals from a plurality of radio or television broadcast antennas or towers or broadcast satellites using appropriate detector technology, and locating the robot by suitable calculation using the known location of the signal source. In each such example, the presence of the GPS satellites and their signals, the presence of cellular telephone communication towers and the signals associated with them, or the presence of radio or television broadcast antennas or towers or broadcast satellites and the signals associated with them, are all provided independently of the robot or its purposes, and may be considered "environmental" signals that occur in the environment without any action on the part of the robot or its operator, in analogy to the magnetic signals present as a consequence of the magnetic properties of the planet Earth. Thus, a robot having one or more detectors suitably configured to receive and to decode any of such "environmental signals" can be programmed to operate in a manner similar to a robot having an electronic digital compass. For the purposes of this discussion, the term "environmental signal" will be understood generally as any artificial signal that is provided for purposes other than for the demarcation of a particular area or path of interest, and that is exploited by a robotic apparatus for traversing an area or a path of interest. The "environmental signals" are detected by a respective one of an environmental signal detector module, such as a GPS detector, a cellular telephone signal detector, or a radio or television signal detector. In using such "environmental signals," in some embodiments a plurality of locations of the robot are determined as it moves, and a vector heading or orientation is derived from two or more deduced locations.

Yet another example of using an "environmental signal" involves a two-part communication. In one embodiment, the robotic apparatus comprises a transmitter and a receiver. The transmitter can in various embodiments be the transmitter found in a cellular telephone, a transmitter such as portable radio device such as a citizen's band radio, or a radio frequency transmitter such as is found in RF-ID technology. The receiver is any receiver that can receive a signal comprising location information. Each robotic apparatus is assigned a unique identification code or number, such as is found in devices of the types mentioned in the previous sentence. When in operation, a robotic apparatus periodically broadcasts at least its unique identification code or number as a message to one or more stations that can identify the source of the message and to locate that source, for example, in a geographical manner. The robotic apparatus can optionally include a "time stamp" or an ordinal value in each message so that a particular message can be identified in a sequence of messages. The stations receive the message or messages, determine the location of the transmitter, and send back to the robotic apparatus a message that including the deduced location of the robotic apparatus. The robotic apparatus uses the location information in the same way it would use location information such as it would deduce using the electronic digital compass described hereinabove. The location information can also be used to calculate a direction of motion by comparing successive locations vectorially.

One method of locating the source of the message is triangulation using direction finding. Another method of locating the source of the message is using "time of flight" with multiple receiver stations. Each receiver station identifies the time of receipt of a particular message. In the event that the robotic apparatus and all of the receiver stations have internal clocks that are synchronized, the distance of the robotic apparatus from each receiver station can be computed directly from the time delay of the transmitted message and the known speed of propagation of the signal. The speed of signal propagation can be calibrated by sending a signal between two receiver stations spaced a known distance apart (e.g., from one cellular telephone cell tower to another tower). The clocks can be periodically reset using one of the clocks as a master, so as to maintain synchrony.

In an embodiment in which a set of synchronized clocks does not exist, or if a time signal is not used, the location of the robotic apparatus can be identified as follows. For any two receiver stations, the difference in time that the same signal is received at two different receiver stations indicates a difference in distance of the robotic apparatus from the two receive stations. In other words, simultaneous reception (e.g., time difference equals zero) indicates that the robotic apparatus is positioned along a line perpendicular to the line connecting the two receiver stations, the perpendicular line intersecting the line connecting the two receiver stations at its midpoint. As the time difference increases, the locus of the possible positions of the robotic apparatus becomes a curvilinear line offset from the aforementioned perpendicular line by a distance x along the line connecting the two receiver stations such that the difference in transit time of the signal is that observed, and meeting the perpendicular line at substantially infinite distance in either direction along the perpendicular line (i.e., at those points where the difference is negligible relative to the absolute distance of the robotic apparatus from either receiver station). By knowing the transit time for a signal between the two locations of the receiver stations, which can be measured, the magnitude of the distance x can be estimated. The precision of measurement of the difference in time of flight of the signal determines the precision of the measurement of the distance x. By measuring a sufficient number of such pairs of time of flight differences, such as three pairs, a location of the robotic apparatus can be identified unambiguously in two dimensions, i.e., on the surface of the Earth, neglecting curvature of the Earth and changes in altitude of different locations. Measuring more that three pairs will give better resolution and added confidence in the accuracy of a location determination. In an alternative embodiment, the receiver stations send the raw data that they receive back to the robotic apparatus, and the computation of a location is performed at the robotic apparatus. In still other embodiments, the signals transmitted by the robotic apparatus and/or the receiver stations are communicated using any convenient electromagnetic radiation, including any of infrared, visible and ultraviolet light, and radio waves in the KiloHertz to the GigaHertz frequency range.

Present day systems, such as Enhanced911 are being deployed by multiple telephone companies to locate cellular telephones over long distances (miles) to within 50 to 100 meters, as is described in an article entitled "They Know Where You Are," that appeared in the July 2003 issue of IEEE Spectrum magazine at pages 20–25. The same article indicates that RF-ID tags can locate objects over distances of meters. Neither of these technologies as disclosed in the article is sufficient for the distances required while providing the accuracy of positioning required in the present invention.

Another embodiment discussed in the IEEE Spectrum article is ultrawideband transmission, which is capable of locating an object over a distance of approximately hundred of meters to perhaps a kilometer (0.62 mile) with an accuracy of approximately one-half meter (approximately 20 inches) to ten meters (approximately 32 feet). Accuracy of one centimeter at distances of one kilometer can be foreseen, but is not yet available. In addition, the apparatus needed for such transmissions is expensive at present, costing about $2000 per base station and about $25 per mobile transponder.

In one embodiment, the invention finds use as a robotic apparatus that can traverse an area of interest autonomously. In one exemplary embodiment, the robotic apparatus is a lawn mowing machine.

In one embodiment, a robotic apparatus has two substantially similar electric motors located on opposite sides of the apparatus, each connected to the frame or chassis with bolts or the like. Speed reduction gears reduce the output rotational speed of each motor. As will be described, the rotational speed and direction of each motor is individually adjustable. The two motors are configured to be controlled individually. A drive system on each side of the robotic apparatus, such as a chain drive connected to a sprocket on a wheel assembly, provides power from each motor to a corresponding wheel. A rubber track is provided on each of the two sides of the chassis. Each track is fastened to one or more wheels, one of which is the wheel driven by the motor, which track moves the robotic apparatus as required.

In one embodiment, a robotic apparatus intended for use as a lawn mower is operated primarily through the use of a gasoline-powered engine. In one embodiment, the apparatus derives its electrical energy needs by employing an alternator driven by the gasoline-powered engine. The gasoline-powered engine also drives a rotating vertical shaft that supports a cutting blade. The blade is connected to the motor by way of a clutch mechanism, so that the motor can remain in operation while the cutting blade can be disengaged. A portion of the AC current generated by the alternator is then converted to DC power to provide for the energy needs of the remaining circuits.

In one embodiment, a machine of the invention is capable of recording directives and digital compass readings while in operation for later playback, can play back recorded instructions, and can operate autonomously according to the recorded instructions. The directives can be provided from an external source. In one exemplary embodiment, a person uses a hand held device such as a cell phone to issue commands that include directives by pressing buttons on the cell phone. For convenience of exposition, a machine with this recording capability will be called a master. In some embodiments, a record and playback device can be remote from the master robotic apparatus and bi-directional communication between the master robotic apparatus and the record and playback device can occur by short-range radio, for example using the 802.11 protocol. In another embodiment, a machine of the invention lacks the feature of recording instructions, but can play back pre-recorded instructions, and can operate autonomously according to the pre-recorded instructions. For convenience of exposition, such a machine will be referred to as a slave. In some embodiments, a slave machine may also lack the feature of receiving directives from an external source, such as a remote control, but instead operates based on recorded information and a start command or the like issued by manipulation of a control, such as a key or a button on the apparatus. In some embodiments, a slave machine can employ a playback device that would be unsuitable for a master machine (i.e., a device lacking recording capability but having playback capability), such as a CD-ROM player, a magnetic tape player, or the like. Such playback-only devices are useful because they have fewer parts (i.e., less that can fail and require repair), and they may be less costly to acquire and use. In some embodiments, a playback device can be remote from the slave robotic apparatus and bidirectional communication between the slave robotic apparatus and the playback device can occur by short-range radio, for example using the 802.11 protocol.

A machine according to the invention, which in one embodiment is powered by a gasoline engine, and in other embodiments is powered electrically, provides mobility through two independently operated electric motors that power treads, which can be rubber tracks. The invention also provides a computer program recorded on a machine-readable medium that operates on a computer, which can be a commercially available microprocessor. One or more programmed computers provide the ability to control the behavior, including guiding a course of motion of the robotic apparatus, and controlling the use of tools that are attached to the robotic apparatus.

Because both master and slave machines according to the invention use the Earth's magnetic field as a reference, there is no requirement for the installation of any artificial objects such as transmitters or barriers to control the motion or behavior of the programmable robotic apparatus when it is operating autonomously. The magnetic field of the planet Earth is a natural phenomenon that does not require the intervention of a human for its presence. When a command or commands recorded on a machine-readable medium are provided to the apparatus, the apparatus can operate autonomously and can take corrective action when it senses that it has deviated from the expected operational behavior.

Turning to FIGS. 1A–1D, there is shown an exemplary embodiment of an apparatus suitable for mowing lawns that traverses an area autonomously. The relationship of FIGS. 1A–1D is shown schematically on FIG. 1C. FIG. 1A shows a remote input device 102 that a user employs for issuing directives, which in one embodiment is a joystick configured to generate DTMF tones in response to manipulations by the user. In other embodiments, the remote input device 102 is a hand held device such as a cell phone that can generate DTMF signals. When a remote input device 102 is used, there is a corresponding command receiver module configured to receive signals from the remote input device or portable transmitter 102. The signals sent by the remote input device comprise directives. The DTMF signals are communicated to a memory module 104 that is configured to store and retrieve information. While being recorded, the DTMF signals are also sent to a DTMF decoder for processing, so as to provide directives to operate the robotic apparatus. In the embodiment of FIG. 1A, memory module 104 is a tape recorder that can record the DTMF signals. In the embodiment shown, the DTMF signals are sent out through the recorder's earphone output jack by wire to be decoded by a DTMF decoder. In other embodiments, the memory module is any device that can store and retrieve information, such as on a floppy disc, a hard disc, a CD-RW disc, RAM, EPROM, EEPROM, and a flash memory. In some embodiments, the directives are recorded in the same format as the format in which they are received. In other embodiments, the directives are recorded in a format different from the format in which the directive is received.

Figure 2:
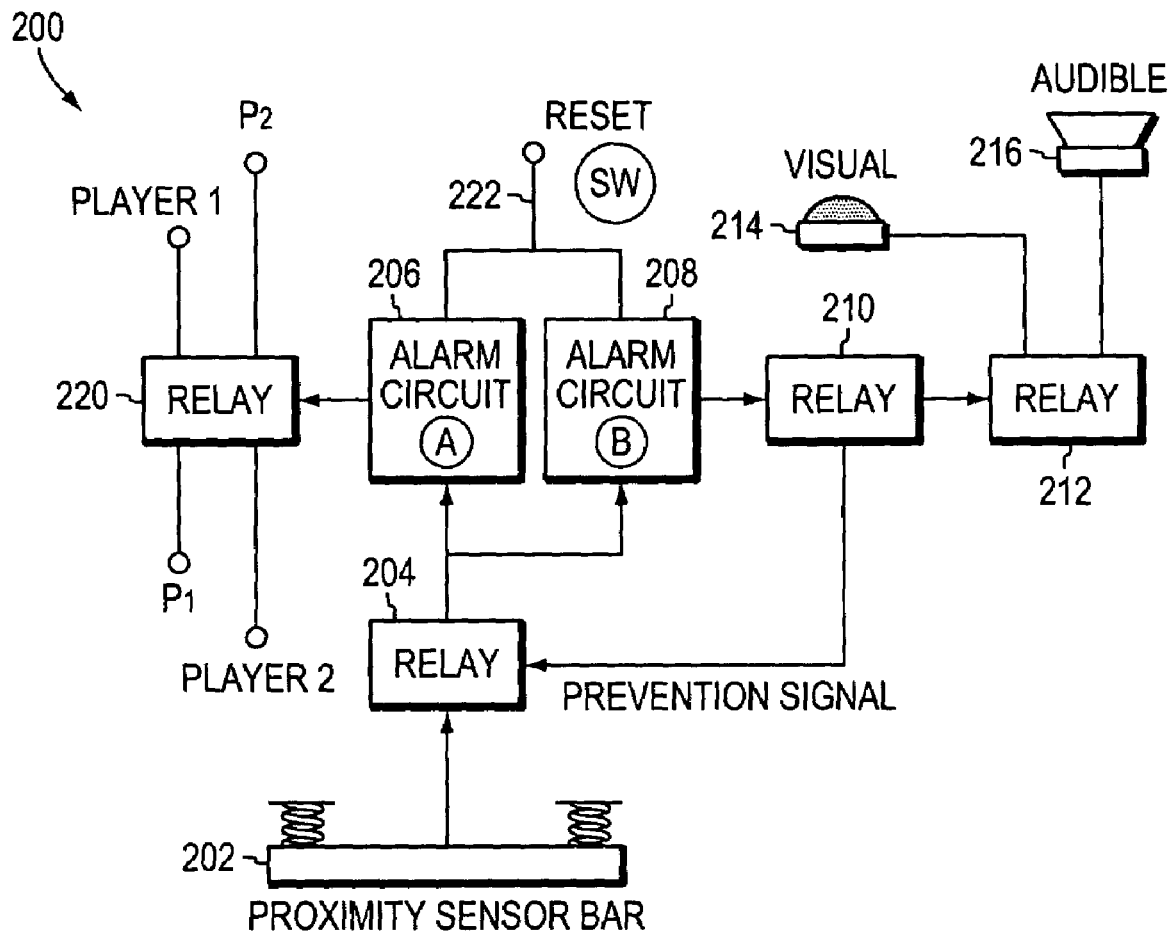
FIG. 2 illustrates an exemplary embodiment of an alarm circuit, according to principles of the invention.

In the embodiment of FIG. 1A, the connection between the input device 102 and the memory module 104 is a cable 103. In other embodiments, the connection can be made by electromagnetic wave signals, such as infrared, light, radio waves, and microwaves. An optional alarm circuit 106, which is shown and described in more detail in FIG. 2, is in electrical communication with memory module 104. A power source 108 is shown as an electrical wall plug, to schematically indicate a source of electrical power to operate the circuitry described herein. The electrical power source can be a battery, an alternator run from a combustion engine mounted on the robotic apparatus, a fuel cell, or any other convenient source of electrical power.

Figure 1B:
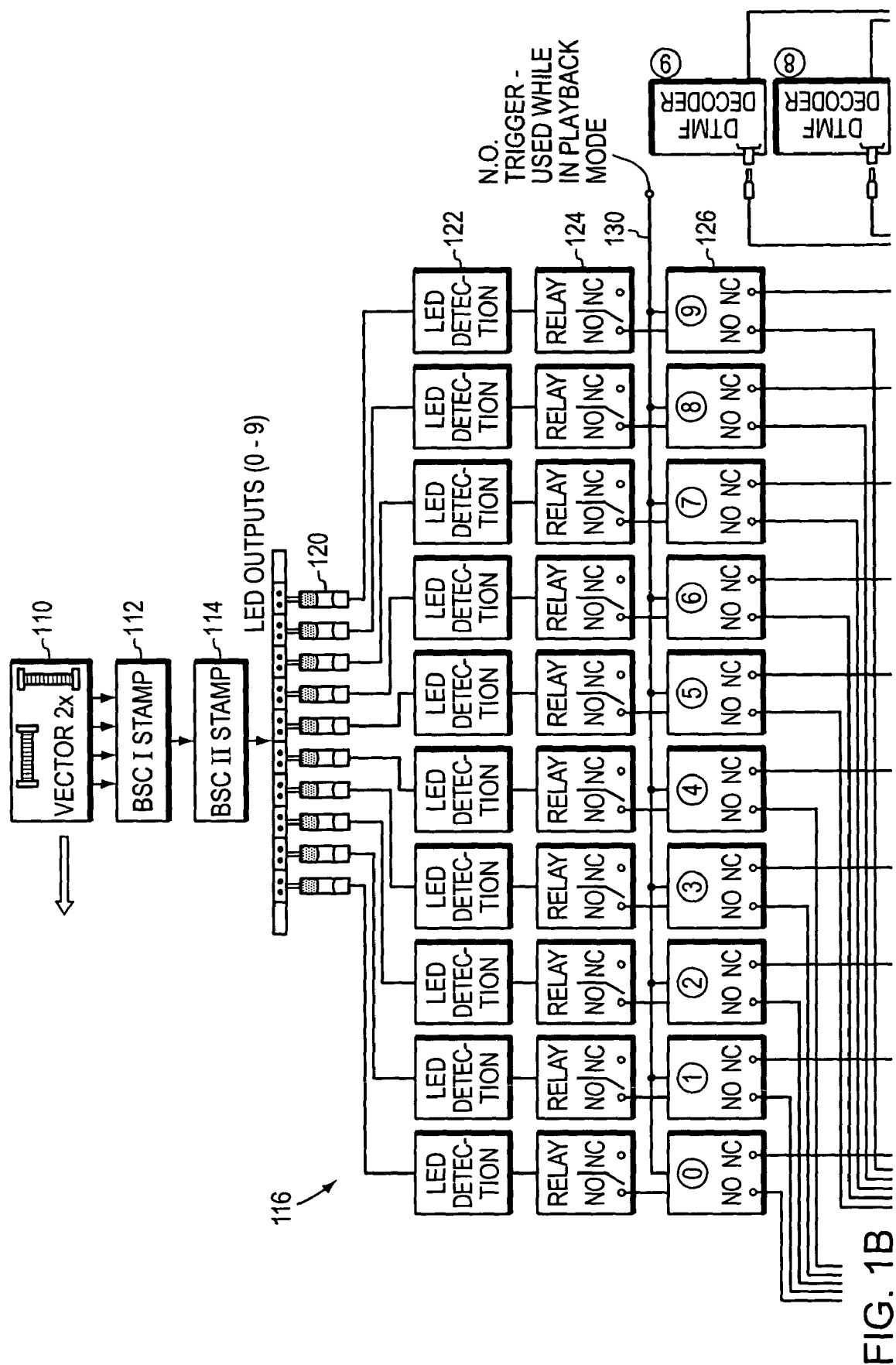

Turning to FIG. 1B, there is shown a compass module 110, which in one embodiment is a Vector2X electronic digital compass. The compass module is in electrical communication with a computer 112, which in one embodiment is a Parallax Basic Stamp Model BS1-IC, available from Parallax, 599 Menlo Drive, Suite 100, Rocklin, Calif. 95765, and having a website at http://www.parallax.com. Information about the BS1-IC can be found at http://www.parallax.com/detail.asp?product_id=BS1-IC. Information about the BS2-IC can be found at http://www.parallax.com/detail.asp?product_id=BS2-IC. Other computers 112 that can be used for interfacing with the Vector 2X electronic digital compass are the Motorola 68HC705C8 processor, the Intel 8751 processor, the Maxim MAX7651 processor, or the like. The computer 112 is programmed with a computer program recorded on a machine-readable medium, such as a program recorded on a memory medium, which medium can be of the type of any of the memory media listed hereinabove. The computer program operating on computer 112 comprises an orientation receiver module that receives orientation information from the compass module 110. As will be understood, one embodiment of circuitry used to practice the invention involves the computers 112 and 114. Other processors having sufficient power may be used as a single processor in place of the two computers 112, 114.

The computer program also includes other modules that perform specific functions for the operation of a robotic apparatus. These modules comprise a supervisory module that controls the autonomous operation of a programmable robotic apparatus and that, as required, receives information recorded on a machine-readable medium, and a computation module that computes an error signal based at least in part on orientation information from the compass module and information recorded on the machine-readable medium. The program in some embodiments further comprises an instruction receiver module that receives directives from an external source regarding operation of the programmable robotic apparatus. The program in other embodiments further comprises an error correction module that, in the event that the error signal exceeds a predetermined value, computes an error correction to be provided as a corrective action command to the programmable robotic apparatus.

As indicated in the embodiment shown in FIG. 1B the computer 112 communicates with another computer 114. The computer 114 as depicted is also a Parallax Basic Stamp Model BS1-IC. In other embodiments, the computers 112 and 114 can be the same computer. Various aspects of the computer program described above can be divided between computers 112 and 114 in embodiments where they are distinct computers. In general, it is not critical where a particular module resides or is operative. Microprocessors are available that have sufficient computational power and speed to be successfully applied in embodiments of the invention. Another issue in addition to power and speed may be the unit cost of the microprocessor. In the future, there will likely be many additional microprocessors that are even more powerful and even less costly than those available today, and which may include some of the features necessary for operation of embodiments of the invention. For example, a new line of chips was introduced on Mar. 12, 2003 by Intel Corporation under the trademark Intel® Centrino™. Some of the features of such newer chipsets include wireless communications, features designed to enable extended battery life, make possible thinner and lighter mobile computer designs, and improved mobile performance.

As depicted in FIG. 1B, the computer 114 generates instructions for the operation of the robotic apparatus, which can be communicated electrically to the electromechanical portions of the apparatus. In the embodiment of FIG. 1B, the computer 114 communicates by way of a plurality of opto-isolators 120 which are shown in greater detail in FIG. 3A as described below. In one embodiment, there are ten communication channels each having an opto-isolator 120 therein. Circuitry 122 for detecting a signal from an LED is provided for each opto-isolator 120. An exemplary embodiment of a detection circuit for detecting the presence of light from an LED is shown in FIG. 3B and described in greater detail with regard to that figure. For each communication channel, the circuitry 122 drives a corresponding relay 124 based on the state of the detected signal (i.e., "on" or "off"). Each relay 124 is connected to another relay 126 that has a normally open trigger connection 130. The trigger 130 is used in what will be called "playback" mode, corresponding to operation using pre-recorded instructions in the form of directives and compass readings. In the mode of operation under control by an external source, which will be called "command" mode or "live" mode, such as control by a user providing signals from a portable transmitter, the trigger input 130 is held high. When in "command" mode, the relays 126 communicate their signals by way of their "normally closed" contact to DTMF encoders 132. In one embodiment, the least significant digit of each numeric value generated by the compass is ultimately stored as a unique DTMF tone when in "command" mode. When in "playback" mode, the relays 126 communicate their signals by way of their "normally open" contacts to circuitry 140, 142 that decodes the least significant, or "units" digit of a reading obtained from the compass module 110.

The compass module 110 and the computers 112, 114 are used to measure the orientation of the compass module 110 (and thereby the orientation of the robotic apparatus to which it is mechanically attached) relative to the magnetic field of the planet Earth. The compass module can be oriented with regard to the robotic apparatus by attaching the compass module 110 to the robotic apparatus, and aligning one of its magnetic coils along a desired direction (such as directly forward) and aligning another of its magnetic coils in a perpendicular orientation to the desired direction so as to define a plane that is substantially parallel with respect to a plane upon which the robotic apparatus rests when the compass module is attached.

The compass module 110 provides electrical signals that can be decoded to derive a magnetic compass heading in increments of one degree, ranging from zero degrees to 359 degrees. For the purpose of controlling the robotic apparatus, an angular correction of one degree or less is sufficient for acceptable operation. In order to observe a change in direction, it is sufficient to observe the change of the least significant digit (or units digit) value of the decoded heading. For example, a change in direction from 72 degrees to either 73 degrees or 71 degrees involves observing the change of the least significant digit value "2" to either "3" or "1." Therefore, decoding signals from the compass 110 so that the least significant digit (i.e., ranging from 0 through 9) is discriminated provides enough signal to deduce that an error has occurred and that a correction is needed. For appreciable changes in direction, for example in excess of 9 degrees, a counter is implemented to tally the successive changes of one degree so as to have available a new heading relative to a previous heading. One can also calibrate the compass to obtain a "true" magnetic heading if that is necessary. The calibration process is explained in U.S. Pat. No. 4,851,775, previously incorporated herein by reference.

Figures 1, 1C:
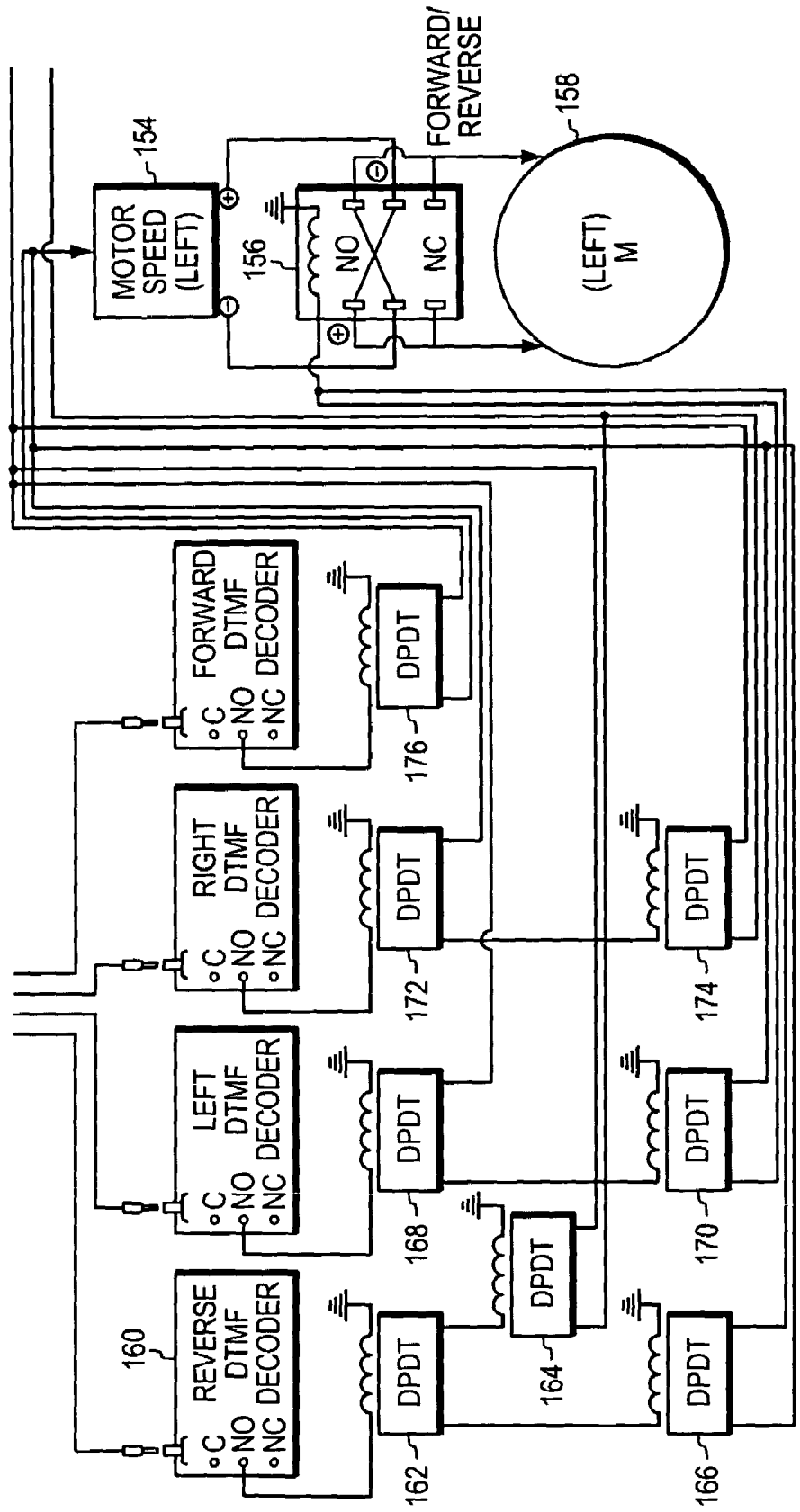

Turning to FIG. 1C, during operation in the "command" mode, signals from the remote input device 102, or during operation in the "playback" mode, signals recorded on the memory module 104, are electrically communicated to each of a plurality of DTMF decoders 160. In the embodiment of FIGS. 1A and 1C, the communication from memory module 104 to DTMF decoders 160 is by wire. In the embodiment shown in FIG. 1C, there are four DTMF decoders 160, one each to determine the presence of a signal corresponding to a command to move in one of four directions, which may be understood as "forward," "backward," "to the right," and "to the left." It is possible that signals for more than one direction can be present at a given time, for example a signal to move forward, and a signal to move to the right, having independent "magnitudes," so as to affect motion in a direction selected within a 90 degree arc. The "magnitudes" can be defined by either or both of an amplitude of a tone signal and a ratio of "on" and "off" durations of the DTMF signal within a time period (i.e., a "duty cycle" of the DTMF signal). Each DTMF decoder 160 is configured to decode only a specific DTMF combination, and to ignore other signals. In response to a DTMF signal specific for a decoder 160, each decoder 160 is activated and trips one or more switches so as to apply electrical signal to motor speed controllers 148, 154, and forward/reverse switches 150, 156, which apply power to driving motors 152, 158 which, respectively, are connected to and which reversibly drive the right tread and the left tread of the robotic apparatus.

Figure 1D:
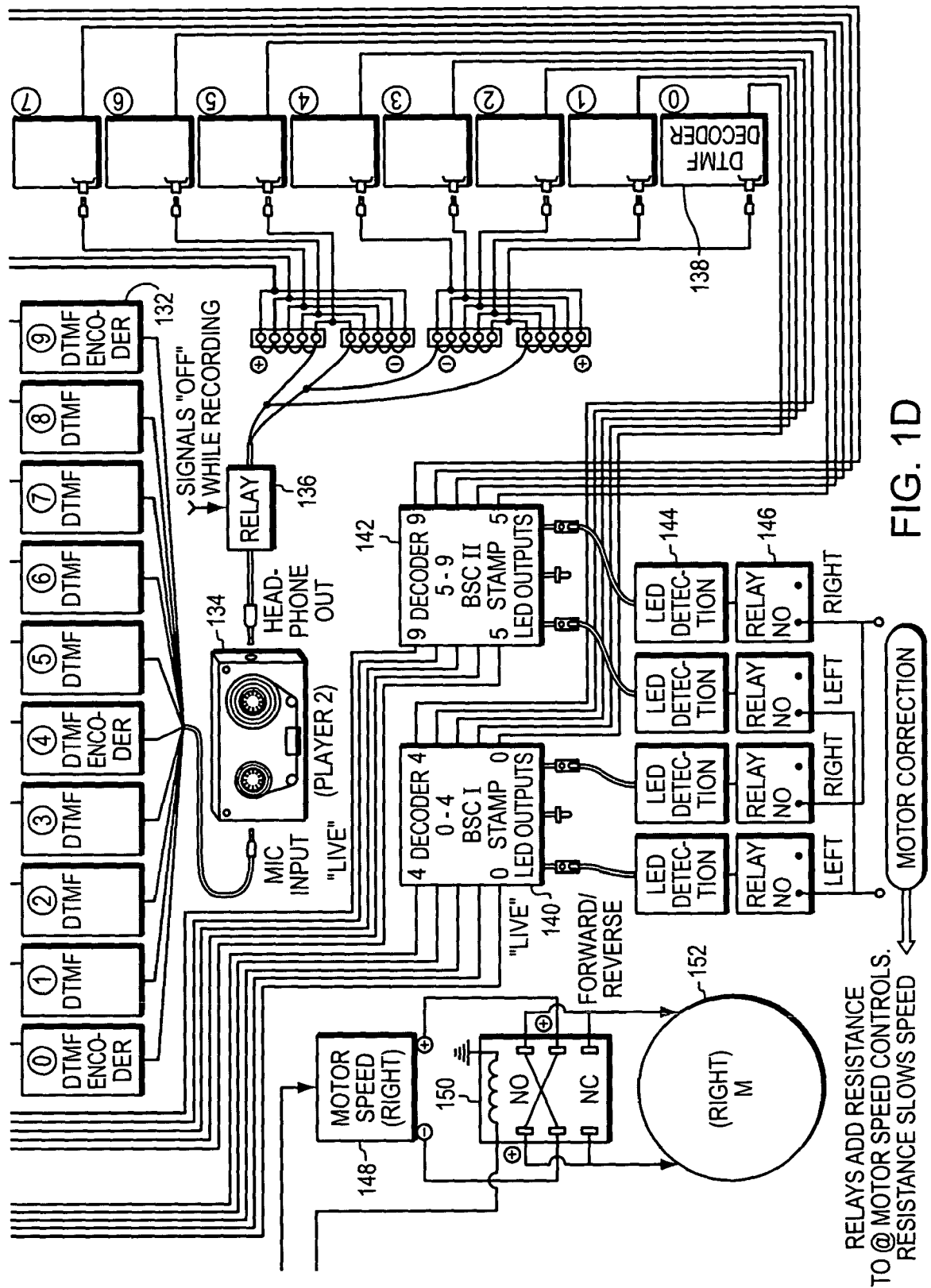

FIG. 1D shows additional portions of the control circuitry of the robotic apparatus. A plurality of DTMF encoders 132 is provided. Each DTMF encoder 132 is electrically connected to a normally closed contact of a respective one of the relays 126. During operation in the "command" mode, when a signal from a selected one of relays 126 is applied to the corresponding DTMF encoder 132, a specific DTMF signal is generated, and is communicated to and recorded by memory module 134 that is configured to store and retrieve information. In the embodiment of FIG. 1D, memory module 134 is a tape recorder that can record the DTMF signals. In other embodiments, the memory module 134 is any device that can store and retrieve information, such as on a floppy disc, a hard disc, a CD-RW disc, RAM, EPROM, EEPROM, and a flash memory. In some embodiments, the memory module 134 and the memory module 104 can be the same memory module.

When the robotic apparatus is in "playback" mode, the relays 126 are respectively connected from their normally open contacts to circuitry that decodes the value of the least significant digit (from "0" to "9") that is being asserted in response to the signal from the compass module 110. The circuitry that decodes the least significant digit value is shown in the embodiment of FIG. 1D as two BSC IC Stamp computers 140, 142 that respectively decode the digits 0–4 and 5–9. In other embodiments, other circuitry, such as a hard-wired logic circuit having 10 inputs and binary coded decimal (BCD) output, can be employed.

When the robotic apparatus is in "playback" mode, the memory module 134 "plays back" its information, or otherwise makes the information recorded thereon available for use. The information, including DTMF signals corresponding to previously recorded least significant digit information, is made available to a plurality of DTMF decoders 138. In the embodiment of FIG. 1D, there are 10 DTMF decoders 138, each configured to decode a signal corresponding to a particular value of a least significant digit pre-recorded in the form of a DTMF signal, as explained above. A decoded signal from DTMF decoders 138 is also applied to the decode circuitry 140, 142. In an alternative embodiment, a second hard-wired logic circuit having 10 inputs and binary coded decimal (BCD) output receives as input the decoded signals from DTMF decoders 138.

The two sets of signals represent the least significant digit available in "playback" mode, one from the compass module 110, and one from the memory module 134. The two representations of the least significant digit are then compared. The comparison circuitry of the embodiment shown in FIG. 1D is a computer 140, 142. In an alternative embodiment, a hard-wired comparator circuit can be used. If the result of the comparison is equality to within a range of tolerance, there is no error and no corrective action is needed. However, if the two signals representing the least significant digit differ by more than the range of tolerance, i.e., if the difference exceeds a predetermined value, then the comparison circuit generates a correction signal depending on whether the recorded least significant digit represents a greater or a lesser angular heading than that represented by the measured orientation from the compass module 110. In this logic, looking at the least significant digit alone, zero is greater than "9" but less than "1," as in 139<140<141, or 359<0<1. If the recorded (i.e., planned) heading is greater than the measured (i.e., current actual) heading, the robotic apparatus is commanded to make a rightward correction, and if the recorded heading is less than the actual heading, the opposite correction is applied. As long as corrective action is taken sufficiently often and the correction is applied promptly, the robotic apparatus will be prevented from deviating far from the desired direction, and will follow the expected path to within a tolerable error.

In the embodiment of FIG. 1D, the result of the comparison by computers 140, 142 appears as a signal that is sent to the motors driving the treads of the robotic apparatus 10, so as to turn the robotic apparatus 10 in the required direction to correct the behavior of the apparatus. One method of applying the corrective action is to slow the motion of the tread on the side to which the turn is to be made relative to the motion of the tread on the opposite side. In other embodiments, the tread on the side opposite to the turning direction is caused to speed up. In yet other embodiments, both corrections are applied together. In some embodiments, causing a tread to slow its motion relative to the other tread can involve reversing the direction of motion of the tread which is to be caused to slow down.

FIG. 1E is an illustrative perspective representation of a robotic apparatus 10, showing a chassis 12 that supports all of the operative mechanisms of the apparatus, including the control system (not shown), the drive motors 152, 158 (shown in phantom), and the treads 180, 182, and that has fittings for attaching thereto one or more tools for performing functions such as grass cutting, vacuuming, snow removal, digging or drilling, or the like, including motors and the like for moving the tools as needed. The tools are not shown. The tools are computer controlled, either by a computer resident in the robotic apparatus, or by a computer provided with the tool that is in communication with the control system of the robotic apparatus.

A "slave" apparatus, as indicated above may lack the remote input device 102, and may comprise a memory module, 104, 134 that employs only pre-recorded media, and that is not capable of recording new information.

FIG. 2 illustrates an exemplary embodiment of an alarm circuit 200. In one embodiment, one or more proximity sensors 202 are located on a bumper that covers the entire perimeter of the covering shroud of the robotic apparatus 10. The purpose of the one or more proximity sensors 202 is to detect objects in a timely fashion as to avoid possible damage to the under carriage, or to the object. Each sensor 202 is wired in parallel, thereby allowing each to trip an alarm circuit in and by itself. When an alarm is activated, the robotic apparatus can be commanded to terminate forward movement, suspend playback, and provide an audible and or visual notification. A manual reset control 222 is provided to deactivate the alarm condition. This prevents continuation of operation until a person intervenes.

The circuit of FIG. 2 includes a switch 204, such as a relay, that receives the alarm signal from the sensor 202. The switch 204 activates a plurality of alarm circuits 206, 208. One alarm circuit 206 activates a switch 220, such as a relay, that stops the "playback" of recorded instructions. Another alarm circuit 208 activates a switch 210 that disables the switch 204, temporarily disconnecting the proximity sensor 202 from the alarm system. Switch 210 also activates switch 212, which can be a relay, that in turn activates a visual signal 214 and an audio enunciator 216. When the reset 222 is activated, all of the switches 204, 210, 212, 220 and the alarm circuits 206, 208 are returned to the state that they had prior to the activation of the proximity sensor. Normally, the robotic apparatus 10 is adjusted, by being moved or by removing the object, before the reset 222 is activated.

The covering shroud comprises a fiberglass body hinged at one end for internal access. Air intakes that provide air to the combustion engine are located on either side of the shroud. The intakes also provide air circulation to cool operating circuits.

A proximity sensor bar detects objects and sends a signal to alarm circuits. A suitable proximity sensor can be constructed using the touch switch kit available from Ramsey Electronics, Inc., 793 Canning Parkway, Victor, N.Y. 14564. The company has a website http://www.ramseyelectronics.com. Information about the touch switch can be found at http://www.ramseyelectronics.com/cgi-bin/commerce.exe?preadd=action&key=TS1.

Figure 3A:
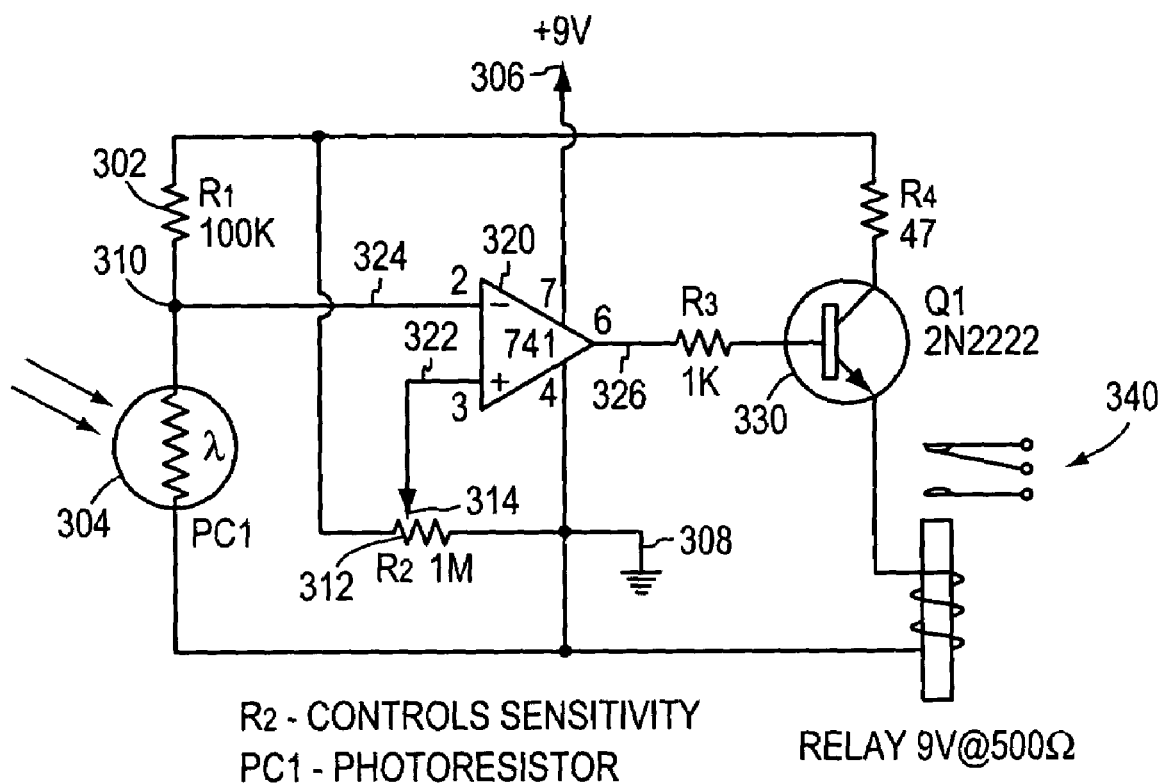
FIG. 3A illustrates a circuit suitable for detection of a signal from a LED, for use according to principles of the invention.
Figure 3B:
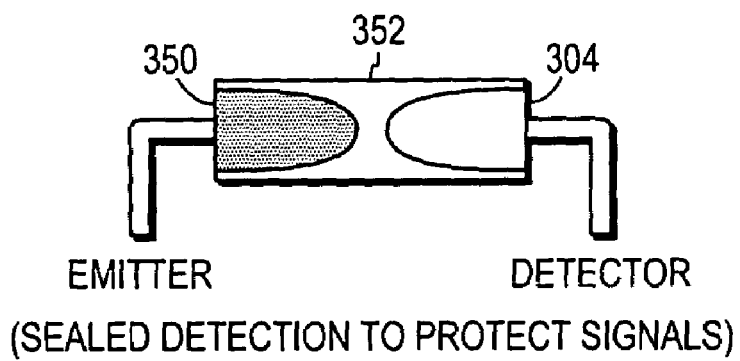
FIG. 3B is a drawing in side section of an LED and an optical detector housed within an opaque containment structure, for use according to principles of the invention.

FIG. 3A illustrates a circuit suitable for detection of a signal from a LED. In FIG. 3A, resistor 302 and photoconductor 304 form a voltage divider between a higher voltage reference 306 (such as +9 Volts) and a lower voltage reference 308 (such as ground potential). In the embodiment of FIG. 3A, the voltage at the node 310 between the resistor 302 and the photoconductor 304 will vary between 0 and 9 volts in proportion to the resistance of the photoconductor to the sum of the resistances of the resistor 302 and the resistance of the photoconductor 304. Since light falling on the photoconductor 304 raises it conductance (i.e., diminishes its resistance) in proportion to the intensity of the light and the number of carriers generated within the photoconductor, higher illumination will reduce the voltage at the node 310. The node 310 is connected to op amp 320 at the negative input terminal 322 thereof.

A variable resistor 312 is connected between voltage references 306 and 308. The variable voltage terminal 314 of variable resistor 312 is connected to the positive input terminal 324 of op amp 320. Reference voltages 306 and 308 also power op amp 320. Op amp 320 provides an output signal at an output terminal 326 thereof. When operated "open loop" as depicted in FIG. 3A, the output signal of op amp 320 is substantially the value of the higher reference voltage (the "positive rail") when the voltage on positive input terminal 322 exceed the voltage on negative input terminal 324. When the voltage on negative input terminal 324 exceeds the voltage on positive input terminal 322, the output signal of op amp 320 is substantially the value of the lower reference voltage (the "negative rail"). The transistor 330 (in the embodiment shown, an NPN 2N2222) turns on when the output of the op amp 320 is at the positive rail, and current flows through the relay 340, activating the relay 340. As will be recognized by those of ordinary skill in the electronic arts, setting the value of the variable resistor 312 as set by contact 314 will determine what level of illumination is needed to activate relay 340.

FIG. 3B is a drawing in side section of an LED and an optical detector housed within an opaque containment structure. In FIG. 3B, the LED 350 is present within housing 352. Photoconductive element 304 is positioned with housing 352 to receive light emitted by LED 350. The housing 352 is opaque in the range of optical signals that activate Photoconductive element 304, so as to eliminate stray radiation that might cause false triggering of photoconductive element 304.

Figure 4:
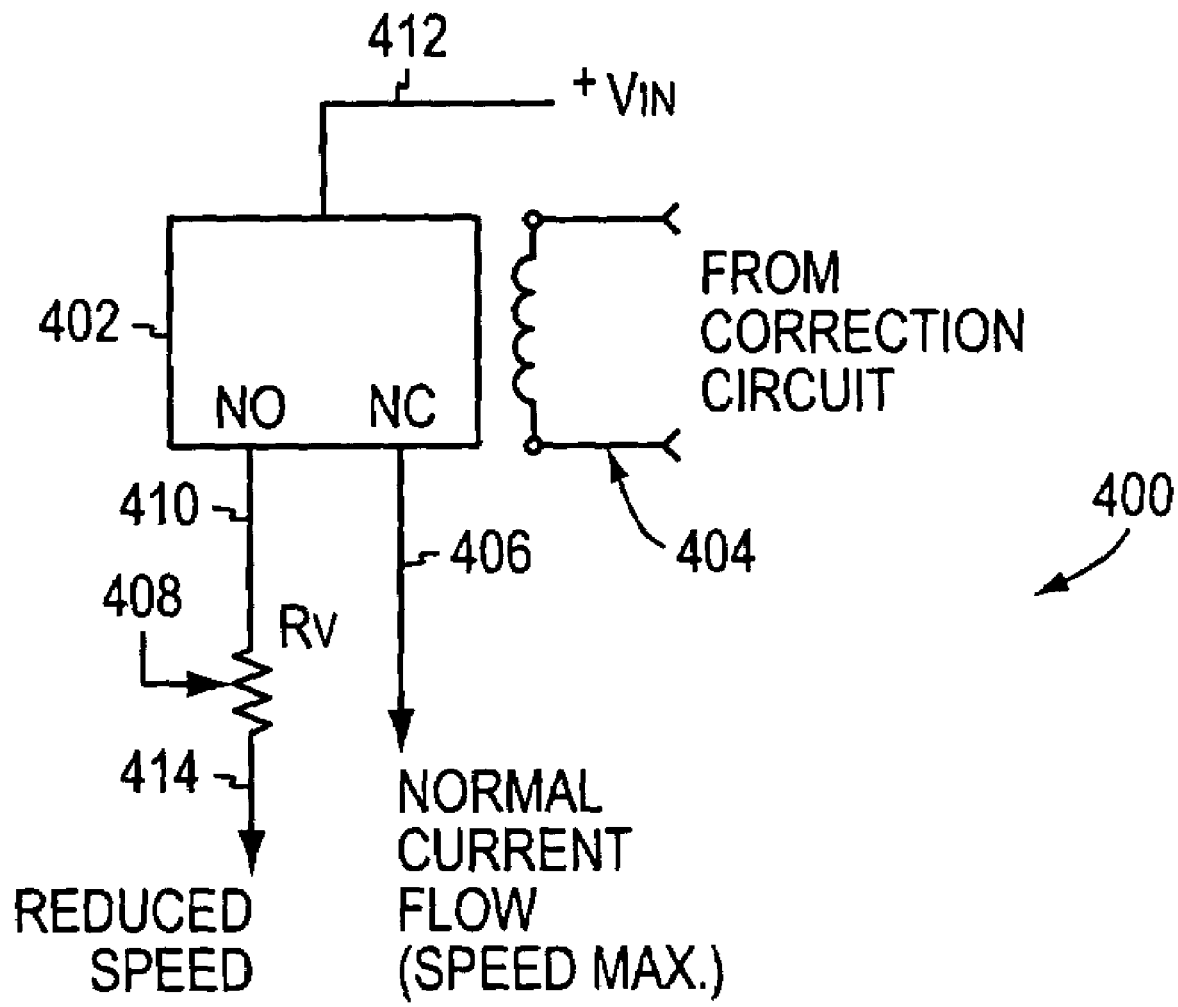
FIG. 4 illustrates an embodiment of a corrective relay circuit, according to principles of the invention.

FIG. 4 illustrates an embodiment of a corrective relay circuit. The circuit 400 of FIG. 4 is used to correct the speed of a motor, such as motors 152, 158. The circuit 400 comprises a relay 402 that can receive a corrective signal, as needed, from a source by way of inputs 404. The relay 402 is connected by way of a normally closed contact 406 to a device to be controlled, such as one of motors 152, 158. The relay 402 has a second connection to one of motors 152, 158 by way of a normally open contact 410 and a variable resistor $R_v$ 408 having an output terminal 414. The relay 402 is powered by connection to power supply $+V_{IN}$, which is connected to input terminal 412 of relay 402. Upon activation of the corrective signal at terminals 404, the normally closed contact opens and the normally open contact closes, thereby providing a reduced current and/or voltage to motor 152 or 158, respectively. The motor is thus caused to reduce its speed, thereby driving its tread at a slower rate. A preferred principle of operation of the DC motor speed control circuit is to vary the amount of time that supply voltage is provided to the motor.

Figure 5:
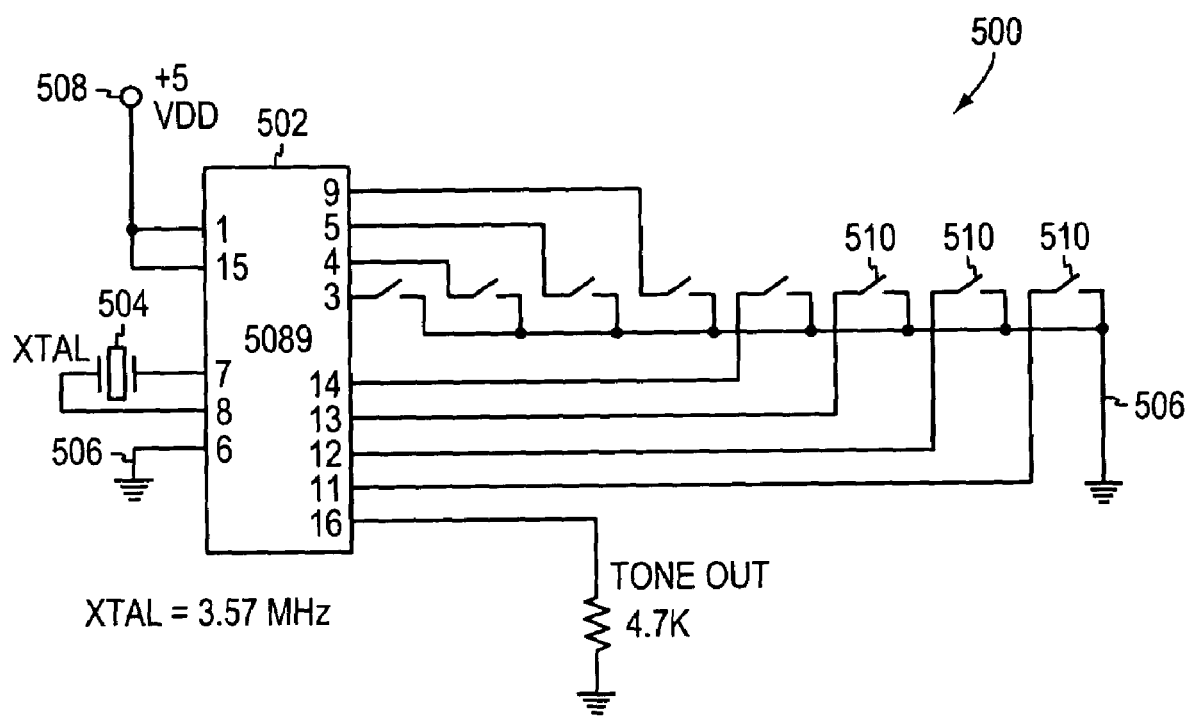
FIG. 5 illustrates an embodiment of a joystick circuit that is useful for providing directives during operation of the robotic apparatus, according to principles of the invention.

FIG. 5 illustrates an embodiment of an input circuit 500 that is useful for providing directives during operation of the robotic apparatus. In one embodiment, a joystick provides the input signals under the control of a user. The following illustrates the schematic layout of the joystick control. The control uses a 5089 DTMF generator chip 502 with a crystal oscillator (xtal) 504 operating at 3.57 MHz. The 5089 DTMF generator chip (or its equivalent) is available from a number of vendors, including for example the TCM5089 from Texas Instruments, Dallas, Tex. Terminal 6 of the DTMF generator chip is connected to ground potential 506. Terminals 1 and 15 of the DTMF generator chip 502 are connected to a positive voltage supply 508, which is some embodiments is +5 Volts. By connecting any of terminals 3, 4, 5, 9, 11, 12, 13, and 14 of DTMF generator chip 502 to ground 506, for example by way of switches 510, a DTMF frequency is generated, and appears at terminal 16 of DTMF generator chip 502. The control can generate 8 distinct frequencies, which can be taken in combinations of two to denote a particular direction (i.e., forward, reverse, right and left). In one embodiment, the frequencies are provided as an electrical signal to the microphone input terminal of a tape recorder for recording. Four switches 510 are implemented within the joystick 102 of FIG. 1A, and by connecting terminals 3, 4, 5, 9, 11, 12, 13,and 14 in pairs to a single switch two tones are generated when any switch in the joystick is caused to close.

Figure 6:
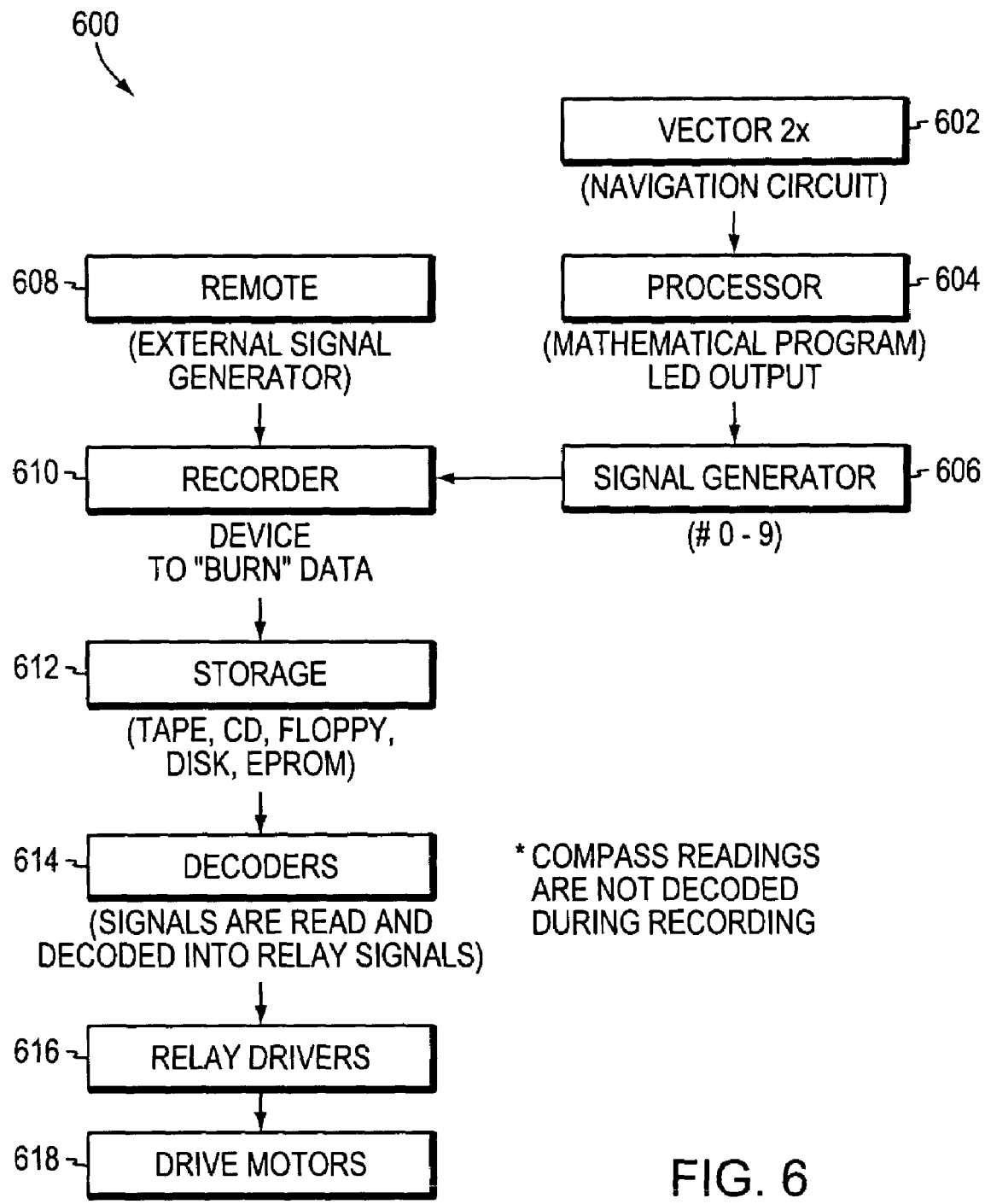
FIG. 6 is a flowchart illustrating a method of providing at least one command recorded on a machine-readable medium, the at least one command representing an instruction for traversing an area of interest, according to principles of the invention.

FIG. 6 is a flowchart 600 illustrating a method of providing at least one command recorded on a machine-readable medium, the at least one command representing an instruction for traversing an area of interest. Each box in flowchart 600 can indicate either or both of a step in a process and a module in a computer program recorded on a machine-readable medium for operation of the programmable robotic apparatus of the invention. As indicated at box 602, a compass, such as the electronic compass 110 described above, takes readings of its own orientation (and thereby, the orientation of the robotic apparatus). In box 604, a computer processor on which the computer program is operating manipulates the raw data from the compass 110 to calculate reading corresponding to a heading, using an orientation receiver module that receives orientation information from the compass module of the programmable robotic apparatus. At box 606, the heading readings are further manipulated to extract control information, such as a least significant digit of a reading. At the same time, the robotic apparatus 10 is being operated by user employing a control apparatus, such as a hand held apparatus like a cell phone, which is an external source of directive for the robotic apparatus, as denoted by box 608. Thus, box 608 will be understood to denote also an instruction receiver module that receives directives from an external source regarding operation of the programmable robotic apparatus.

At box 610, there is denoted a device that records information, including the directives from box 608, and the readings of orientation and headings. This will also be understood to denote a module that controls the recording of information on a machine-readable medium for recovery and use at a later time. At box 612, there is denoted a storage step, which is the step of recording the directives and compass readings (in raw and/or in decoded format) on a recordable machine-readable medium, as described hereinabove.

At box 614, signals including directives and compass readings are decoded as necessary, and are provided to switches that control aspects of the operation of the robotic apparatus. At box 616, the switches (in some embodiments, relays) are activated. At box 618, the robotic apparatus is activated by way of driving motors and the like.

Figure 7:
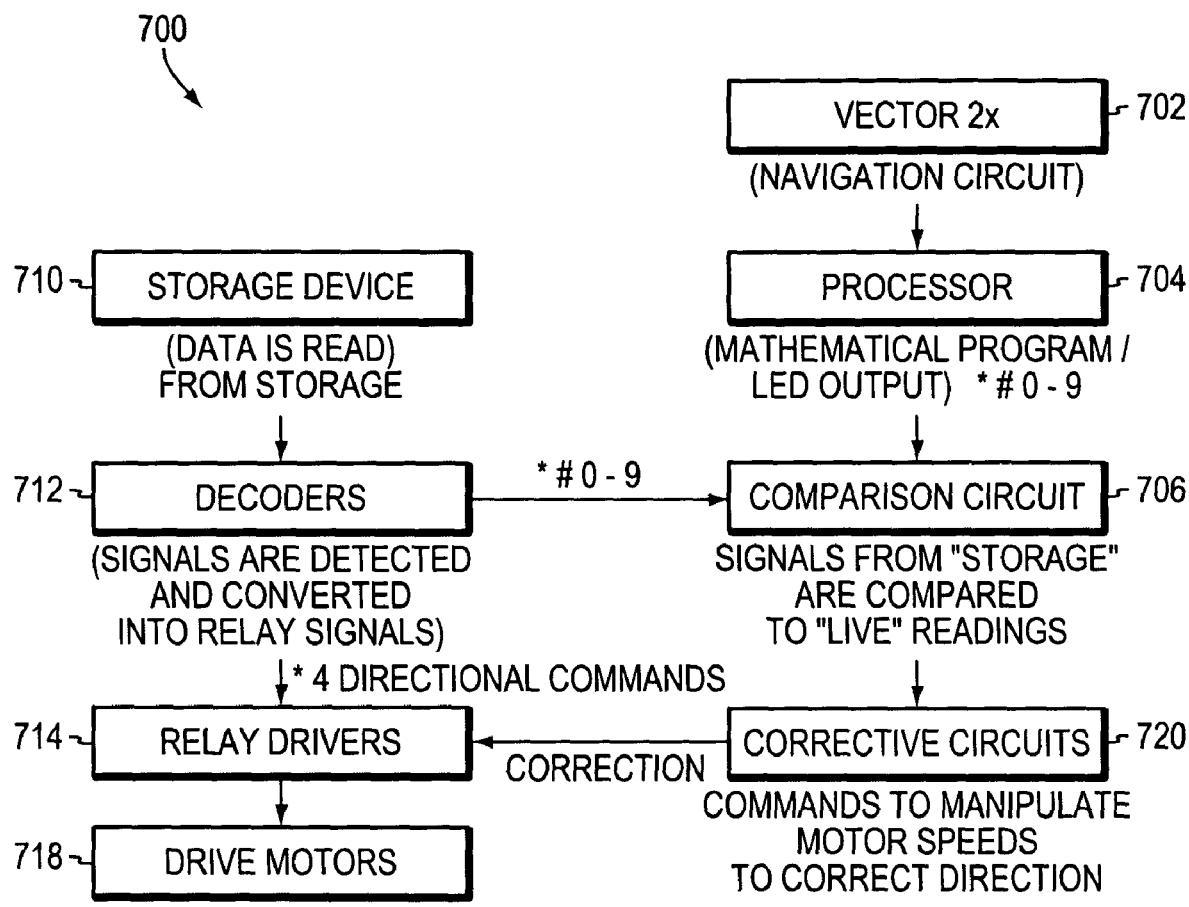
FIG. 7 is a flowchart illustrating a method of operating the robotic apparatus, according to principles of the invention.

FIG. 7 is a flowchart 700 illustrating a method of operating either a master or a slave robotic apparatus autonomously. Each box in flowchart 700 can indicate either or both of a step in a process and a module in a computer program recorded on a machine-readable medium for operation of the programmable robotic apparatus of the invention. While not indicated in flowchart 700 explicitly, as previously described, a user places the robotic apparatus in operating mode. As indicated at box 702, a compass, such as the electronic compass 110 described above, takes readings of its own orientation (and thereby, the orientation of the robotic apparatus). In box 704, a computer processor on which the computer program is operating manipulates the raw data from the compass 110 to calculate reading corresponding to a heading, using an orientation receiver module that receives orientation information from the compass module of the programmable robotic apparatus.

At box 706, the heading readings are compared with information, such as information recorded in prior operation of a master robotic apparatus. This information is made available by way of a machine-readable medium in a storage device, as denoted by box 710. At box 712, the stored information is decoded as needed, and is supplied both to the comparison circuit at box 706, and to switches, such as relays, as indicated at box 714 to operate the apparatus. Thus, box 706 will be understood to denote also a computation module that computes an error signal based at least in part on orientation information from the compass module and information recorded on the machine-readable medium.

Box 706 can compute whether there has been an error in the operation of the robotic apparatus 10, by comparing the actual orientation signals and the expected (i.e., previously recorded) orientation signals and directives to look for discrepancies. Box 706 will also be understood to denote an error correction module that, in the event that the error signal exceeds a predetermined value, computes an error correction to be provided as a corrective action command to the programmable robotic apparatus. Box 706 can thus send corrective information to box 720.

At box 720, there is denoted a device that issues commands including correction signals to control the robotic apparatus 10 to take corrective actions. At box 714, signals including operational signals and corrective signals, as required, are provided to switches such as relays that control aspects of the operation of the robotic apparatus. At box 718, the switches (in some embodiments, relays) are activated. At box 718, the robotic apparatus is activated by way of driving motors and the like. The computers that control both master robotic apparatus and slave robotic apparatus include a supervisory module that controls the autonomous operation of a programmable robotic apparatus and that, as required, receives information recorded on a machine-readable medium. When the robotic apparatus has completed its programmed activities, it is turned off, either by an explicit instruction in the computer program, or by the intervention of the user.

In an exemplary embodiment, the robotic apparatus is a modified 20" mowing chassis containing twin electric motors adjacent from one another providing mobility. Each motor is bolted to the frame with sliding mounting brackets to aid in chain tension. From each of the motors, reduction gears are connected to chain assembly, which transfers power down to a sprocket mounted drive wheel. These rotations are counted as electrical pulses and stored for later distance measurements. Maintaining distances ensures the machine does not wander without detection. Rubber tracks are there powered to provide for smooth mobility over diverse terrain. Tension is applied to the tracks with the aid of tension bars, which contain adjustable springs delivered by stainless steel wheels. By applying pressure on the bars in the opposite direction, tension is removed momentarily from the belt thereby allowing for replacement.

In the exemplary embodiment, power is generated by the use of an alternator from which it derives its power by the rotating vertical shaft controlled by a gasoline engine. The AC generated by the alternator is then converted to DC with the aid of a conversion circuit. The electricity is then sent to a central panel where it sources out its DC power to the remaining circuits. A battery stores the remainder of unused electricity for later recall.

In this exemplary embodiment, the vertical shaft powered by the gasoline engine is monitored for strain or an increase in load by a current monitoring circuit. As a load increases, current follows in direct proportion. This detection serves as a monitor for cutting tall grass and prevents the engine form stalling out under duress. Should the current increase sufficiently enough to be detected, an additional circuit will be employed to slow the forward progress and if necessary, stop and reverse before continuing.

In this exemplary embodiment, each drive motor is controlled by a variable speed limiting circuit, which determines their revolutions per minute. Resistance added within this circuit reduces the amount of current fed to the motors, ultimately slowing revolutions for slight directional tuning. Each circuit also has the ability through relays, to switch rotational directions for forward and reverse commands.

In one exemplary embodiment, to begin programming the system, a user designates a starting location. Once an area has been selected, four hollow spikes or tubes are then introduced into the earth to be made flush with the surface. This is achieved by applying slight pressure with ones foot in order to set the spikes. In areas where the earth's density is greater than tapping with the aid of a hammer may be used. A set of guides allow for an accurate placement, as they need to be aligned with the machine. Once the hollow spikes or tubes are made flush, the machine is then placed over the configuration and aligned with placement rods. A rod is placed in each of the four corners of the chassis, allowing for an accurate initial alignment. A consistent starting location is useful to the machines playback operation.

In one exemplary embodiment, a joystick is used to control four commands during programming, forward, left, right, and reverse. Each command is selected by positioning the controller in the four directions. In other embodiments, a hand held transmitting device, such as a cellular telephone, can be used to provide commands. The command generates a unique frequency corresponding with each command. The data is then entered into a recording device through a microphone input and is stored on magnetic tape. Data is simultaneously fed out through the output of he tape player into a series of frequency decoders. These decoders look for unique signatures responsible for controlling the drive motors. This gives immediate feedback to the programmer by viewing the movement behavior of the machine.

A digital compass module, the Vector2x, will enhance the programming data by providing raw measurements to correspond with command inputs. The compass is read by a stamp circuit, which provides for a numeric output. The data is then fed to an adjoining stamp circuit where it is broken into ten possible combinations. Each is represented with a light emitting diode that signals its presence by illuminating. The illumination is detected by light sensitive circuits, which then activate specific relays. These relay control frequency encoders that generate a signal to represent each of the ten possible data outputs. The signals are then fed through a microphone input into a magnetic tape recorder for storage.

In one exemplary embodiment, the programmer overlaps the cutting of the grass by ⅓ the width of the lawn mower. This safeguards any slight changes throughout the entire playback procedures and offers a margin of error.

In the exemplary embodiment described, upon playback, the digital compass serves as a live reading from which recorded data is then compared to. There unique frequencies are detected and their corresponding relays are activated. The electrical signals provided from the decoders are sent to two processors for comparison to those provided from the compass. The two sets of signals representing compass readings are then compared for analysis. This step determines whether the machine is in one of three possible states. They include 1 degree right, 1 degree left and or, center. Of these three states, only the first two signify a need for correction. The processors indicate the status of the three states and output a corresponding signal by activating a light emitting diode.

In the exemplary embodiment, when the diode representing left is activated, a light sensitive circuit senses its presence and triggers a relay. This relay sends a signal to the right side drive motor control where, it increases electrical resistance thereby slowing the motor in direct proportion. When the correction is complete, electrical resistance in the motor controls is returned back to its normal state. This allows the machine to correct its heading slightly to the right, returning back onto its intended course while in forward motion.

In the exemplary embodiment, when the center position is activated, there are no commands being sent to the drive motor control's as there in no correction needed. The diode representing the center position is primarily used to allow a user to calibrate the system.

In the exemplary embodiment, when the diode representing right is activated, a light sensitive circuit senses its presence and triggers a relay. This relay sends a signal to the left side drive motor control where, it increases electrical resistance thereby slowing the motor in direct proportion. When the correction is complete, electrical resistance in the motor controls is returned to its normal state. This allows the machine to correct its heading slightly to the left, returning back onto its intended course while in forward motion.

In one embodiment, each electrical circuit and/or device that can generate electrical fields or hat can be affected by electrical fields, can be enclosed, or "wrapped" with a grounded shield mesh (i.e., a Faraday cage) to prevent interference between components.

In another embodiment, for example for use in a "surveillance" mode or "night watchman" mode of operation, the robotic apparatus can have a plurality of sets of instructions pre-recorded, each set of instructions corresponding to one of a plurality of paths traversing an area of interest. One of the pre-recorded sets of instructions can be selected for use in any particular traverse of the area of interest, so that the robotic apparatus behaves in a manner that is not predictable with certainty by a disinterested observer. For example, the selection of a particular set of instructions can be based on a random number generator that can be programmed as a random number generator module in the computer program recorded on a machine-readable medium. The selection can in different embodiments be made by the robotic apparatus itself, or by an external actor, such as a user, or a computer program under the control of a user. The robotic apparatus can use tools such as an electronic camera, a video camera, a radio, a chemical sensor, a biological sensor and the like to detect and to report a condition that deviates from a pre-defined base condition.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. A programmable robotic apparatus, comprising:
a drive system comprising a plurality of independently operable treads;
a control module in electrical communication with said drive system, said control module configured to command the operation of each tread;
a memory module in electrical communication with said control module, said memory module configured to store and retrieve information;
a transmitter in electrical communication with said control module, said transmitter configured to transmit a signal comprising at least a unique identifier associated with the robotic apparatus; and
a receiver in electrical communication with said control module, said receiver configured to receive a signal comprising location information;
whereby said robotic apparatus is able to discern at least one of a location and an orientation of said programmable robotic apparatus.

2. The programmable robotic apparatus of claim 1, wherein said apparatus is configured to operate autonomously based at least in part on information stored in said memory module.

3. The programmable robotic apparatus of claim 1, further comprising a tool configured to perform a mechanical operation.

4. The programmable robotic apparatus of claim 3, wherein said tool configured to perform a mechanical operation is selected from the group consisting of a cutting tool, a shoveling tool, and a vacuuming tool.

5. The programmable robotic apparatus of claim 3, wherein said programmable robotic apparatus is a programmable lawn mower.

6. The programmable robotic apparatus of claim 1, wherein said memory module is selected from the group consisting of a magnetic tape, a floppy disc, a hard disc, a CD-ROM, a CD-RW disc, RAM, EPROM, EEPROM, and a flash memory.

7. The programmable robotic apparatus of claim 1, wherein said programmable robotic apparatus is configured to discern at least one of a location and an orientation relative to at least one of a cellular telephone communication antenna, a radio broadcast antenna, a television broadcast antenna, a radio broadcast satellite, and a television broadcast satellite.

8. The programmable robotic apparatus of claim 1, further comprising a command receiver module in electrical communication with said control module.

9. The programmable robotic apparatus of claim 8, wherein said command receiver module is configured to receive signals from a portable transmitter.

10. The programmable robotic apparatus of claim 8, wherein said command receiver module is configured to receive signals comprising directives.

11. The programmable robotic apparatus of claim 1, further comprising at least one command recorded on a machine-readable medium, said at least one command representing an instruction for traversing an area of interest, said programmable robotic apparatus being adapted to autonomously traverse an area of interest by the performance of the steps of:
operating said programmable robotic apparatus according to said at least one command recorded on said machine-readable medium;
discerning at least one of a location and an orientation of said programmable robotic apparatus;
comparing said at least one of said location and said orientation of said programmable robotic apparatus to a corresponding one of a location and a direction recorded in said at least one command to determine an error signal; and
in the event that said error signal exceeds a predetermined value, commanding said programmable robotic apparatus to take a corrective action;
whereby said programmable robotic apparatus autonomously traverses an area of interest.

12. The programmable robotic apparatus of claim 11, further adapted to performed iteratively during a period of operation of said programmable robotic apparatus the steps of discerning at least one of a location and an orientation, comparing at least one of said location and said orientation, and in the event that said error signal exceeds a predetermined value, commanding said programmable robotic apparatus to take a corrective action.

13. The programmable robotic apparatus of claim 11, further adapted to perform an operation with a mechanical tool attached to said programmable robotic apparatus.

14. The programmable robotic apparatus of claim 13, wherein said programmable robotic apparatus is configured to stand in one location during said operation with said mechanical tool.

15. The programmable robotic apparatus of claim 1, configured to record at least one command on a machine-readable medium, the at least one command representing an instruction for traversing an area of interest, wherein the recording of said at least one command is accomplished by performing the steps of:
operating said programmable robotic apparatus under external control, the programmable robotic apparatus receiving directives from an external source and traversing an area of interest;
taking readings from a receiver of said programmable robotic apparatus said receiver configured to receive a signal comprising location information; and
recording said directives and readings on a machine-readable medium for later recovery.

16. The programmable robotic apparatus of claim 15, wherein said directives are recorded in the format in which said directives are received.

17. The programmable robotic apparatus of claim 15, wherein said directives are recorded in a different format from the format in which said directives are received.

18. The programmable robotic apparatus of claim 1, further comprising a computer program recorded on a machine-readable medium, said computer program comprising:
a supervisory module that controls the autonomous operation of the programmable robotic apparatus of claim 1 and that, as required, receives information recorded on a machine-readable medium;
an orientation receiver module that derives orientation information from a signal received by a receiver of said programmable robotic apparatus, and
a computation module that computes an error signal based at least in part on orientation information derived from said environmental signal detection module and information recorded on said machine-readable medium.

19. The programmable robotic apparatus of claim 18, further comprising:
an instruction receiver module that receives directives from an external source regarding operation of said programmable robotic apparatus.

20. The programmable robotic apparatus of claim 18, further comprising:

an error correction module that, in the event that said error signal exceeds a predetermined value, computes an error correction to be provided as a corrective action command to said programmable robotic apparatus.

* * * * *